Sept. 15, 1959   W. L. ADAMS ET AL   2,903,908
MULTIPLE SHAFT BEARING STRUCTURES
Filed July 7, 1958

INVENTORS.
WILLIAM L. ADAMS
WILLIAM L. ADAMS, JR.

ATTORNEYS.

United States Patent Office 2,903,908
Patented Sept. 15, 1959

2,903,908
MULTIPLE SHAFT BEARING STRUCTURES
William Lyal Adams, Bell, and William Lyal Adams, Jr., La Mirada, Calif.

Application July 7, 1958, Serial No. 747,017

11 Claims. (Cl. 74—579)

This invention has to do generally with improvements in shaft bearing supporting structures, and relates particularly to novel forms and arrangements of mounts whereby a pair of "floating" bearings for rotatably journaled shafts are rendered self-alignable with their respective shafts throughout bodily movement of the bearing assembly.

As is well-known, various instances arise where it is desirable to render self-aligning, bearings within which their shafts are journaled for rotation either in a ball or roller type bearing or in a sleeve type bearing. Although applicable to various uses, the invention has been occasioned by the recognition of needs for interconnecting a pair of full floating bearings in a manner such that the interconnection enables each bearing to be supported with the other and in a manner such that the bearings are individually self-alignable with their shafts which have varying relative angularity by reason of bodily lateral movement of one shaft relative to the other. Thus, typically, the invention is applicable to the journaling of a pair of shafts whose relative positions may vary because of swinging oscillation of one of the shafts to transmit bodily lateral vibration to the other, the capacity of the bearing assembly for independent alignability of the individual bearings arising from pivotal accommodation of the bearing mountings within a simple supporting structure.

In accomplishment of the object of rendering a pair of parallel axis bearings independently floating and therefore independently self-alignable, we position between a pair of mounting members, a pair of bearing bodies or blocks journaled for independent rotation and containing preferably roller bearings which can journal a pair of shafts so that the assembly floats in accommodation of the relative shaft movements and the bearings accommodate the varying shaft positions and angularities assumed in the course of that movement.

All the features and objects of the invention, as well as the details of certain illustrative embodiments, will be understood clearly from the following detailed description of the accompanying drawing, in which.

Figure 1:
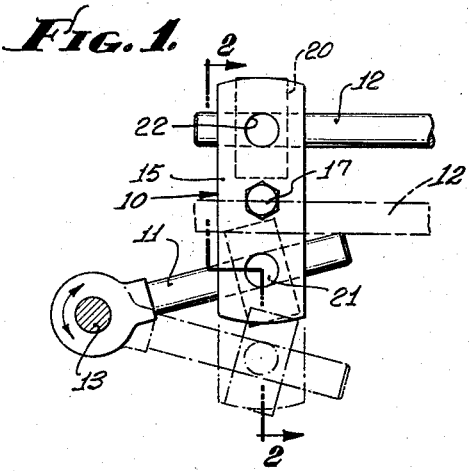
Fig. 1 is a view showing the shaft and interconnecting bearing assembly in side elevation.

Referring first to Fig. 1 the floating bearing assembly generally indicated at 10 is shown to interconnect a pair of shafts 11 and 12, capable of relative rotation and relative lateral movement, according to the particular purpose for which the bearing assembly may be used. As illustrative, shaft 11 is shown to be carried by a shaft 13 which is driven by suitable means, not shown, to oscillate shaft 11 between the solid and broken line positions. Here the function of the bearing assembly 10 is to transmit the oscillations of shaft 11 to shaft 12 so that the latter is subjected to bodily vibration. This type of shaft and bearing interconnection may be used typically for the transmission of high frequency vibration from shaft 11 being oscillated by shaft 13, to any of various structures to which shaft 12 may be connected. Such connection may be such that shaft 12 does not swing but is laterally displaced between the solid and broken line positions of Fig. 1. As will now appear, the assembly 10 is so constructed as to provide bearings for the shafts 11 and 12 which accommodate in self-aligning relation the changing relative angularities and positions of the shafts.

Figure 2:
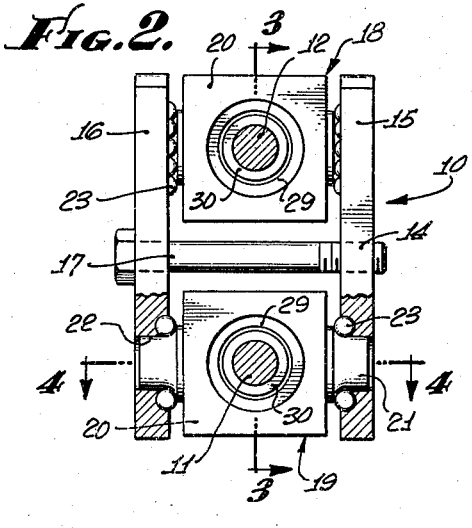
Fig. 2 is a view taken on broken line 2—2 of Fig. 1 but with the bearing bodies aligned.
Figure 3:
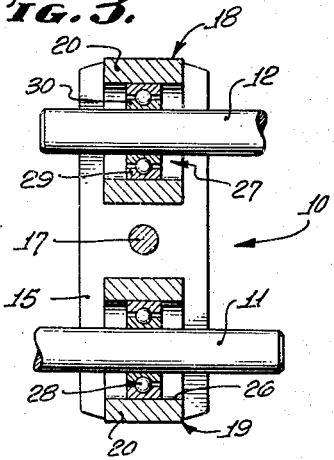
Fig. 3 is a cross-section on line 3—3 of Fig. 2.
Figure 4:
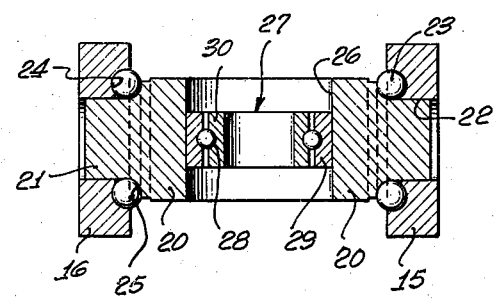
Fig. 4 is a section on line 4—4 of Fig. 2.

As illustrated in Figs. 2 to 4, the assembly 10 comprises a bearing mount structure 14 comprising a pair of metallic side members 15 and 16 interconnected at their longitudinal centers preferably by means such as bolt 17 permitting adjustable tensioning of the sides to confine the bearings. The shafts 11 and 12 are received within bearings generally indicated at 18 and 19 at opposite sides of the bolt 17, each bearing including a block or body 20 having integral, diametrically opposed trunnions 21 received within openings 22 in the side members, and journaled for minimized friction oscillation therein by roller bearings, preferably balls 23 traveling within race ways 24 respectively in the members 15 and 16, and ways 25 in the outer face of the body 20 about the trunnions 21. Each body 20 contains within its bore 26 a roller bearing generally indicated at 27 made-up of ball bearings 28 retained between an outer rotatively stationary race ring 29 (press fitted with the body) and the inner rotating ring 30.

The bearing structure 10 may be assembled to assure snug confinement of the bodies 20 against bearings 23 while allowing adequate freedom for oscillation, and to compensate for any tendency for looseness to develop as a result of wear at the side bearings under the vibratory conditions. By tightening bolt 17 to the extent productive of slight bending of members 15 and 16 at their centers (the bolt being fixed against turning by the tightness of its threads), the members are slightly flexed and resiliently tensioned so that the bearing blocks remain confined by inward pressure of the members.

As will be apparent, by reason of their capacity for oscillatory movement, the bearing assemblies 18 and 19 follow and adjust in self-aligning relation to the positions and relative angularities assumed by their shafts 11 and 12, throughout the reciprocatory displacements of shaft 12 in response to the oscillations of shaft 11.

Figure 5:
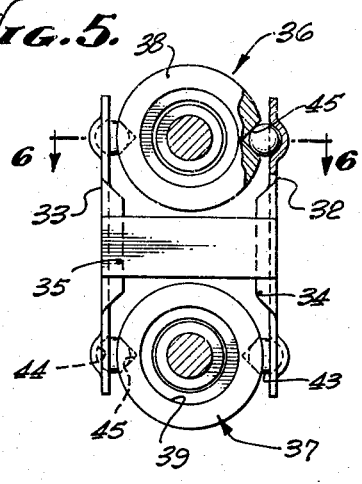
Fig. 5 is a view generally similar to Fig. 2 illustrating a variational form of the invention.
Figure 6:
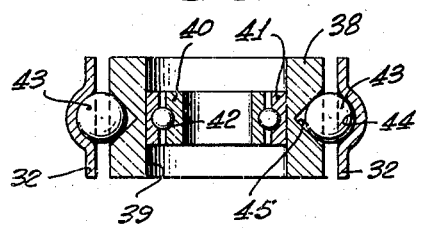
Fig. 6 is an enlarged cross-section on line 6—6 of Fig. 5.

Figs. 5 and 6 illustrate a variational form of the invention in which the side members 32 and 33 of the bearing mount or frame, are adapted to be formed as stampings having in-turned flanges 34 at the opposite center edges of each member, the flanges being interconnected by welded-on straps 35, the latter being between the projected positions of the bearing assemblies 36 and 37. Each of the assemblies 36 and 37 comprises a body 38, the bore 39 of which contains, as in the first described embodiment, a bearing composed of inner and outer race rings 40 and 41, and ball bearings 42 between the rings. Here the body 38 is mounted or journaled for oscillation between members 32 and 33 by a pair of steel balls 43 received within recesses 44 and 45, respectively, in the side members and body 38. Thus, bearings 43 mount the inner assemblies 36 and 37 for oscillations within the mount, and the body-contained bearings support or journal the respective shafts. Avoidance of initial or developed looseness in the journaling afforded by the bearings 43, may be assured by slightly drawing together at their centers and thereby tensioning the members 32 and 33, at the time of their interconnection by the straps 35.

We claim:

1. A bodily movable bearing assembly comprising a bearing mount structure including a pair of spaced, interconnected sides, a pair of shaft bearing bodies positioned between said sides, first bearing means journaling said bodies for independent oscillation in a plane paralleling said sides, and second bearing means within said bodies for journaling a pair of shafts for rotation therein.

2. A bodily movable bearing assembly comprising a bearing mount structure including a pair of spaced, interconnected sides, means extending across said bearing mount at a location between said bodies to connect said sides, a pair of shaft bearing bodies positioned between said sides, first bearing means journaling said bodies for independent oscillation in a plane paralleling said sides, and second bearing means within said bodies for journaling a pair of shafts for rotation therein.

3. A bodily movable bearing assembly comprising a bearing mount structure including a pair of spaced interconnected sides, means extending across said bearing mount at a location between said bodies and interconnecting and maintaining said sides under bending strain at their longitudinal centers by tensioned condition of said interconnecting means, a pair of shaft bearing bodies positioned between said sides, first bearing means journaling said bodies for independent oscillation in a plane paralleling said sides, and second bearing means within said bodies for journaling a pair of shafts for rotation therein.

4. The combination of claim 1, in which said bodies are journaled by means received within openings in said sides.

5. The combination of claim 1, in which said first and second bearing means include ball bearings.

6. The combination of claim 1, in which said bodies contain concentric race rings with ball bearings between them.

7. The combination of claim 2, in which said bodies contain concentric race rings with ball bearings between them, said bodies being mounted for oscillation by journaling means received within said sides.

8. The combination of claim 7, in which said journaling means includes a pair of trunnions projecting from each body.

9. The combination of claim 7, in which said journaling means each comprises a single ball bearing.

10. The combination of claim 1, together with a pair of shafts journaled in said second bearing means, one of said shafts having lateral swinging movement in said plane relative to the other shaft.

11. The combination of claim 7, together with a pair of shafts journaled in said second bearing means, one of said shafts having lateral swinging movement in said plane relative to the other shaft.

References Cited in the file of this patent

UNITED STATES PATENTS

| | | |
|---|---|---|
| 210,646 | Tornguist | Dec. 10, 1878 |
| 634,205 | Dieht et al. | Oct. 3, 1899 |
| 1,213,819 | Bearup | Jan. 30, 1917 |
| 1,871,861 | Rossman | Aug. 16, 1932 |
| 2,235,976 | Best | Mar. 25, 1941 |